United States Patent
Fontana, Jr. et al.

(10) Patent No.: US 8,070,554 B2
(45) Date of Patent: Dec. 6, 2011

(54) DISTRIBUTED SHUNT STRUCTURE FOR LAPPING OF CURRENT PERPENDICULAR PLANE (CPP) HEADS

(75) Inventors: Robert E. Fontana, Jr., Santa Jose, CA (US); Neil Leslie Robertson, Palo Alto, CA (US); Huey-Ming Tzeng, Santa Jose, CA (US)

(73) Assignee: Hitachi Global Storage Technologies, Netherland B.V., Amsterdam (NL)

( * ) Notice: Subject to any disclaimer, the term of this patent is extended or adjusted under 35 U.S.C. 154(b) by 1388 days.

(21) Appl. No.: 10/990,926

(22) Filed: Nov. 17, 2004

(65) Prior Publication Data

US 2006/0103983 A1    May 18, 2006

(51) Int. Cl.
 *B24B 49/00* (2006.01)
(52) U.S. Cl. .................................. 451/5; 451/57; 451/8
(58) Field of Classification Search .................. 451/1, 5, 451/8, 9, 57–59; 29/603.1, 603.9, 603.12, 29/603.15, 603.16
See application file for complete search history.

(56) References Cited

U.S. PATENT DOCUMENTS

| | | | |
|---|---|---|---|
| 5,361,547 A | 11/1994 | Church et al. | |
| 5,588,199 A | 12/1996 | Krounbi et al. | |
| 5,761,009 A | 6/1998 | Hughbanks et al. | |
| 5,772,493 A | 6/1998 | Rottmayer et al. | |
| 5,911,455 A | 6/1999 | Draaisma et al. | |
| 6,003,361 A * | 12/1999 | Amin et al. | 73/7 |
| 6,193,584 B1 * | 2/2001 | Rudy et al. | 451/5 |
| 6,532,646 B2 * | 3/2003 | Watanuki | 29/603.12 |
| 6,633,459 B2 | 10/2003 | Heim et al. | |
| 6,760,197 B2 | 7/2004 | Boutaghou et al. | |
| 6,786,803 B2 * | 9/2004 | Crawforth et al. | 451/41 |
| 6,884,148 B1 * | 4/2005 | Dovek et al. | 451/5 |
| 6,935,923 B2 * | 8/2005 | Burbank et al. | 451/5 |
| 2002/0066177 A1 | 6/2002 | Takada et al. | |

FOREIGN PATENT DOCUMENTS

| | | |
|---|---|---|
| JP | 56159830 | 10/1981 |
| JP | 62099911 | 5/1987 |
| JP | 2000076630 | 3/2000 |
| JP | 2003142756 | 5/2003 |

OTHER PUBLICATIONS

"Using Magneto-Resistive Head Transducers as Lapping Transducers and a Parallel Resistor System to Calculate Lapping Constants" IBM TDB, Sep. 1993, pp. 79ff.
"Electrostatic Shielding for Magnetoresistive Read Heads" IBM TDB, Apr. 1979, pp. 4459ff.
"Magneto Resistive-Sensor Protection on Wafer Level" IBM TBBD, Feb. 1996, pp. 207ff.

* cited by examiner

*Primary Examiner* — Dung Van Nguyen (57) ABSTRACT

An apparatus and method for lapping and fabricating a read/write head is described. The lapping method includes performing a first lapping process on a structure having the read/write head fabricated therein. The first lapping process is for reducing a first resistive region. The first resistive region is located proximal to a surface of the structure. The first lapping process is for achieving a first lapping benchmark. The lapping method further includes performing a second lapping process on a second resistive region. The second lapping process laps at a rate lesser than the first lapping process. The second lapping process is for achieving a second lapping benchmark. The second resistive region is interposed between the first resistive region and the read/write head. The second resistive region has a different resistive value than the second resistive region.

6 Claims, 10 Drawing Sheets

DISTRIBUTED SHUNT STRUCTURE FOR LAPPING OF CURRENT PERPENDICULAR PLANE (CPP) HEADS

FIELD OF THE INVENTION

The present invention relates to magnetic head fabrication. More particularly, the present invention provides a read/write head having a distributed shunt structure for reduced electrostatic discharge and lapping induced.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 40 years ago and resembles a phonograph. That is, the hard drive model includes a plurality of storage disks or hard disks vertically aligned about a central core that spin at a standard rotational speed. A plurality of magnetic read/write transducer heads, for example, one head per surface of a disk, is mounted on the actuator arm. The actuator arm is utilized to reach out over the disk to or from a location on the disk where information is stored. The complete assembly, e.g., the arm and head, is known as a head gimbal assembly (HGA)

In operation, the plurality of hard disks are rotated at a set speed via a spindle motor assembly having a central drive hub. Additionally, there are channels or tracks evenly spaced at known intervals across the disks. When a request for a read of a specific portion or track is received, the hard disk drive aligns a head, via the arm, over the specific track location and the head reads the information from the disk. In the same manner, when a request for a write of a specific portion or track is received, the hard disk drive aligns a head, via the arm, over the specific track location and the head writes the information to the disk.

Over the years, refinements of the disk and the head have provided great reductions in the size of the hard disk drive. For example, the original hard disk drive had a disk diameter of 24 inches. Modern hard disk drives are generally much smaller and include disk diameters of less than 2.5 inches (micro drives are significantly smaller than that). Refinements also include the use of smaller components and laser advances within the head portion. That is, by reducing the read/write tolerances of the head portion, the tracks on the disk can be reduced in size by the same margin. Thus, as modern laser and other micro recognition technology are applied to the head, the track size on the disk can be further compressed.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPM) can be achieved. For example, it is not uncommon for a hard disk drive to reach speeds of 15,000 RPM. This second refinement provides weight and size reductions to the hard disk drive and increases the linear density of information per track. Increased rates of revolution also provide a faster read and write rate for the disk and decrease the latency, or time required for a data area to become located beneath a head, thereby providing increased speed for accessing data. The increase in data acquisition speed due to the increased RPM of the disk drive and the more efficient read/write head portion provide modern computers with hard disk speed and storage capabilities that are continually increasing.

Particularly, with regard to data storage devices, these advances have attributed to increases in storage density. However, the increase in storage density has led to a weaker and/or smaller signal strength emitted by each data bit. This has required the development of read/write heads having increased sensitivity to the intensity of the signals emitted by the data bits. Those skilled in the art utilizing techniques for fabricating read/write heads are constantly searching for alternatives that provide increased sensitivity to the read/write head.

Specifically, within the read/write head fabrication and assembly process, once the read/write head wafer is fabricated and sliced, creating separate head sliders, there is a lapping process. The lapping process thins and polishes the head slider. This lapping process, in part, determines the flying height of the read/write head over the disk, the sensor dimension, and the sensitivity of the sensor.

Figure 1:
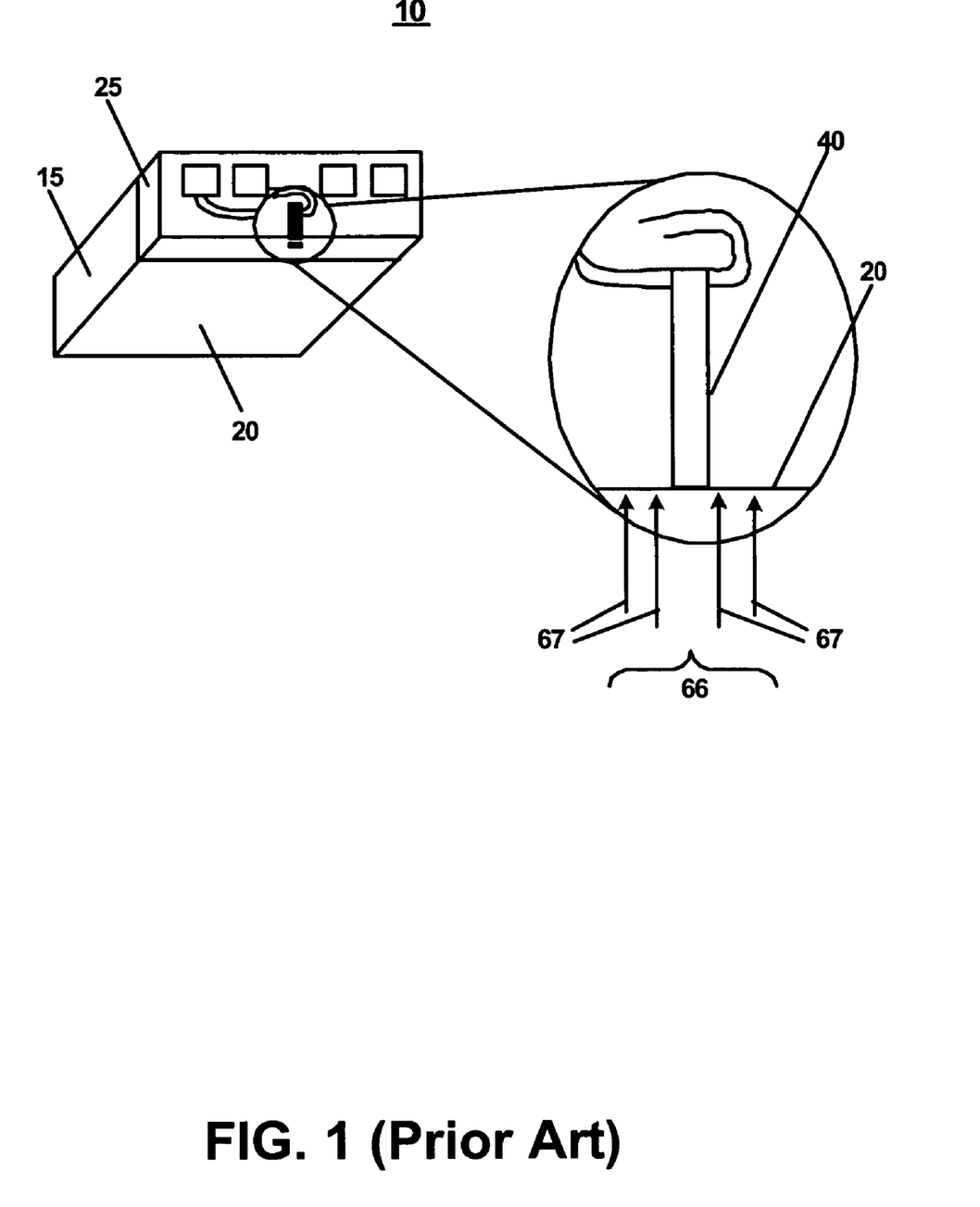
FIG. 1 is a prior art block diagram of a read/write head wafer lapping environment in which a conventional lapping process is performed on a conventionally fabricated read/write head wafer.

Prior art FIG. 1 shows a conventional lapping environment 10 depicting a common lapping process 66 to be performed on a customarily fabricated and sliced read/write head wafer 15. Read/write head slider 15 includes a deposition surface 25 upon which the layers and components of the read/write head slider 15 are deposited. Read/write head 15 also includes a surface 20 upon which the lapping process 66 is performed. Surface 20 is commonly referred to as an air bearing surface and is the surface of the read/write head slider 15 that is most proximal to a data bearing surface of the platter upon which a data bit is stored. Slider 15 also includes a sensor 40 for sensing the charge state of data on a data storage device, e.g., a hard disk drive, and for affecting change in data charge state. Lapping process 66 is performed on surface 20 and sensor 40 as indicated by arrows 67. It is noted that conventional lapping processes, e.g., 66, are performed directly on sensor 40 as sensor 40 has been extended to contact surface 20 during fabrication.

However, because lapping process 66 is applied to sensor 40, the abrasive quality of lapping process 66 creates a layer material under stress of process 66 that can induce degradation of the magnetic sensor response. In many instances, this degradation can completely disable sensor 40, thus requiring new wafer fabrication. Further, lapping process 66 can also induce surface damage to sensor 40. Lapping induced surface damage is known to cause deadening of sensor 66, rendering the sensor incapable of detecting a charge state of a data bit. Further, by virtue of sensor 40 exposure, conventional lapping process 66 can contribute to electrostatic discharge (ESD), further reducing sensitivity of sensor 40.

Further, because of sensor 40 being comprised of one material, e.g., a single element or a composition of elements, there is no detectable resistance difference within the material comprising sensor 40. Thus, conventional lapping processes are resigned to utilize time of lap and rate of lap to control the lapping process.

A common solution to achieve a better lap is to cause a smoother (more precise) lapping process 66 that, while slower than a rough lap, can provide a finer lap. It is known that a smoother lap can consume a non-trivial amount of time to achieve proper lapping. Economically, at some point the result achieved with a smoother lap is overshadowed by the amount of time, e.g., cost, required to achieve the desired result.

SUMMARY OF THE INVENTION

A method for lapping a read/write head is described. The present method includes performing a first lapping process on a structure having the read/write head fabricated therein. The first lapping process is for reducing a first resistive region. The first resistive region is located proximal to a surface of the structure. The first lapping process is for achieving a first lapping benchmark. The present method further includes performing a second lapping process on a second resistive region. The second lapping process laps at a rate lesser than the first lapping process. The second lapping process is for achieving a second lapping benchmark. The second resistive region is interposed between the first resistive region and the read/write head. The second resistive region having a different resistive value than the second resistive region.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

A read/write head lapping process and fabrication technique is described. In the following description, for purposes of explanation, numerous specific details are set forth in order to provide a thorough understanding of the present invention. It is noted that one skilled in the art will comprehend that the present invention may be practiced without these specific details. In other instances, well-known structures and devices are shown in block diagram form in order to avoid obscuring the present invention.

Some portions of the detailed descriptions, which follow, are presented in terms of procedures, steps, logic blocks, processing, and other symbolic representations of operations that can be performed in the fabrication of read/write heads. These descriptions and representations are the means used by those skilled in the data processing arts to most effectively convey the substance of their work to others skilled in the art. A procedure, executed step, logic block, process, etc., is here, and generally, conceived to be a self-consistent sequence of steps or instructions leading to a desired result. The steps are those requiring physical manipulations of physical entities. Usually, though not necessarily always, these entities take the form of structures, elements, or layers implemented in the fabrication of read/write head assemblies. It is usual, although not always, that the manipulations, alone or in combination with computer implemented instructions, are performed by a machine particular to the structure and to the manipulation being performed.

It should be borne in mind, however, that all of these and similar terms are to be associated with the appropriate physical entities and are merely convenient labels applied to these entities. Unless specifically stated otherwise as apparent from the following discussions, it is appreciated that throughout the present invention, discussions utilizing terms such as "forming" or "indicating" or "detecting" or "ceasing" or "lapping" or "implementing" or "reducing" or the like, refer to the actions and processes of a read/write head lapping and/or fabrication process or similar technique that manipulates and transforms those entities into operable read/write devices or other such data storage enabling devices.

The present invention is discussed primarily in the context of read/write head assemblies, such as a current perpendicular plane (CPP) read/write head. Alternatively, embodiments of the present invention are well suited to be implemented in the fabrication of other read/write heads, such as anistropic magnetoresistive ((A)MR) heads or a giant magnetoresistive (GMR) heads. However, it is noted the present invention can be used with other types of read/write heads and associated fabrication techniques that have the capability to affect access upon a storage device and from which data can be stored and/or otherwise manipulated With reference now to FIG. 2A, a schematic drawing of one embodiment of an information storage system comprising a magnetic hard disk file or drive 200 for a computer system is shown. Drive 200 has an outer housing or base 210 containing a disk pack having at least one media or magnetic disk 215. The disk or disks 215 are rotated (see arrows 206) by a spindle motor assembly having a central drive hub 217. An actuator 221 comprises a plurality of parallel actuator arms 225 (one shown) in the form of a comb that is movably or pivotally mounted to base 210 about a pivot assembly 223. A controller 219 is also mounted to base 210 for selectively moving the comb of arms 225 relative to disk 215.

Figure 2A:
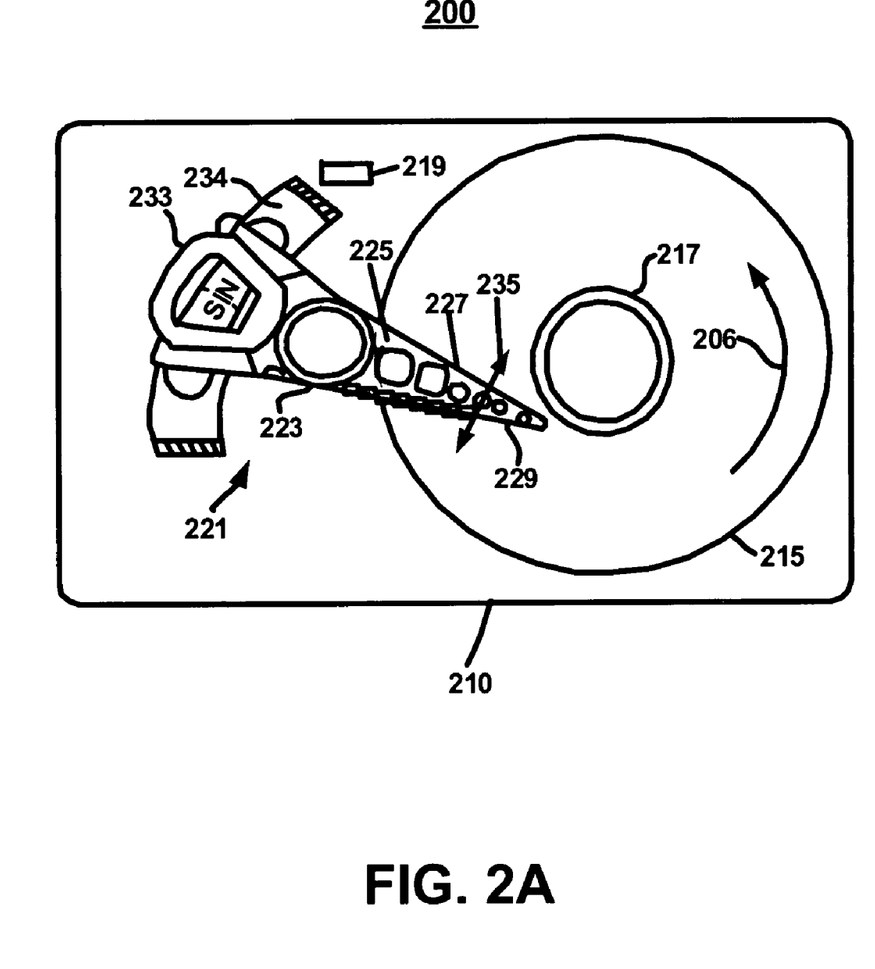
FIG. 2A is an illustrated top-view schematic of components of a hard disc drive upon which embodiments of the present invention can be practiced, in accordance with an embodiment of the present invention.

In the embodiment shown, each arm 225 has extending from it at least one cantilevered load beam and suspension 227. A magnetic read/write transducer or head is mounted on a slider 229 and secured to a flexure that is flexibly mounted to each suspension 227. The read/write heads magnetically read data from and/or magnetically write data to disk 215. The level of integration called the head gimbal assembly is head and the slider 229, which are mounted on suspension 227. The slider 229 is usually bonded to the end of suspension 227. The head is typically "pico" size (approximately 1250×1000×300 microns) and formed from ceramic or intermetallic materials.

The head also may be of "femto" size (approximately 850× 700×230 microns) and is pre-loaded against the surface of disk 215 (in the range two to ten grams) by suspension 227.

Suspensions 227 have a spring-like quality, which biases or urges the air-bearing surface of the slider 229 against the disk 215 to cause the slider 229 to fly at a precise distance from the disk. A voice coil 233 free to move within a conventional voice coil motor magnet assembly 234 (top pole not shown) is also mounted to arms 225 opposite the head gimbal assemblies. Movement of the actuator 221 (indicated by arrow 235) by controller 219 moves the head gimbal assemblies along radial arcs across tracks on the disk 215 until the heads settle on their respective target tracks. The head gimbal assemblies operate in a conventional manner and always move in unison with one another, unless drive 211 uses multiple independent actuators (not shown) wherein the arms can move independently of one another.

Figure 2B:
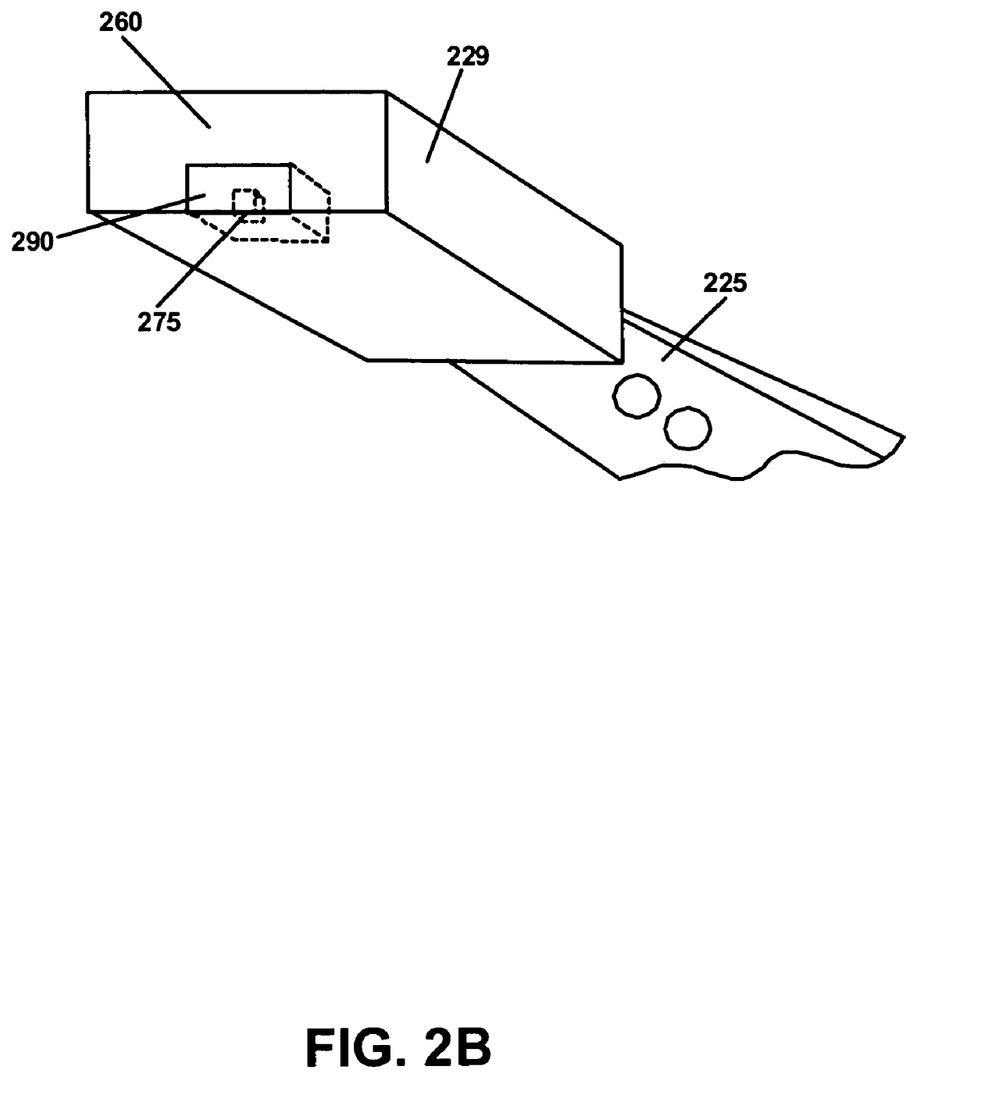
FIG. 2B is an exploded view block diagram of a read/write head component of FIG. 2A upon which embodiments of the present invention can be practiced, in accordance with an embodiment of the present invention.

FIG. 2B is an exploded view of an actuator arm 225 as shown in FIG. 2A. Upon actuator arm 225 are shown a slider 229 and a read/write head 260 and a sensor 275. Slider 229 is the intermediate component of FIG. 2A which includes a read/write head 260 upon which a read/write head sensor 275 is disposed, in an embodiment of the present invention. Read/write head 260 magnetically reads data from and/or magnetically writes data to disk 215 (not shown). Sensor 275 is for sensing the charge state of a data bit of disc 215 and for affecting a change in the charge state. Sensor 275 is oriented to be operable proximal to the gap between the bottom surface 290 of read/write head 260 (relative to the data bearing surface of disc 215) and the data bearing surface of disc 215. The surface 290 from which sensing is performed by sensor 275 is referred to the air bearing surface (ABS). Embodiments of the present invention provide a lapping and fabrication process for a read/write head 260 including a sensor 275 that are implementable in a disc drive 200.

Figure 3A:
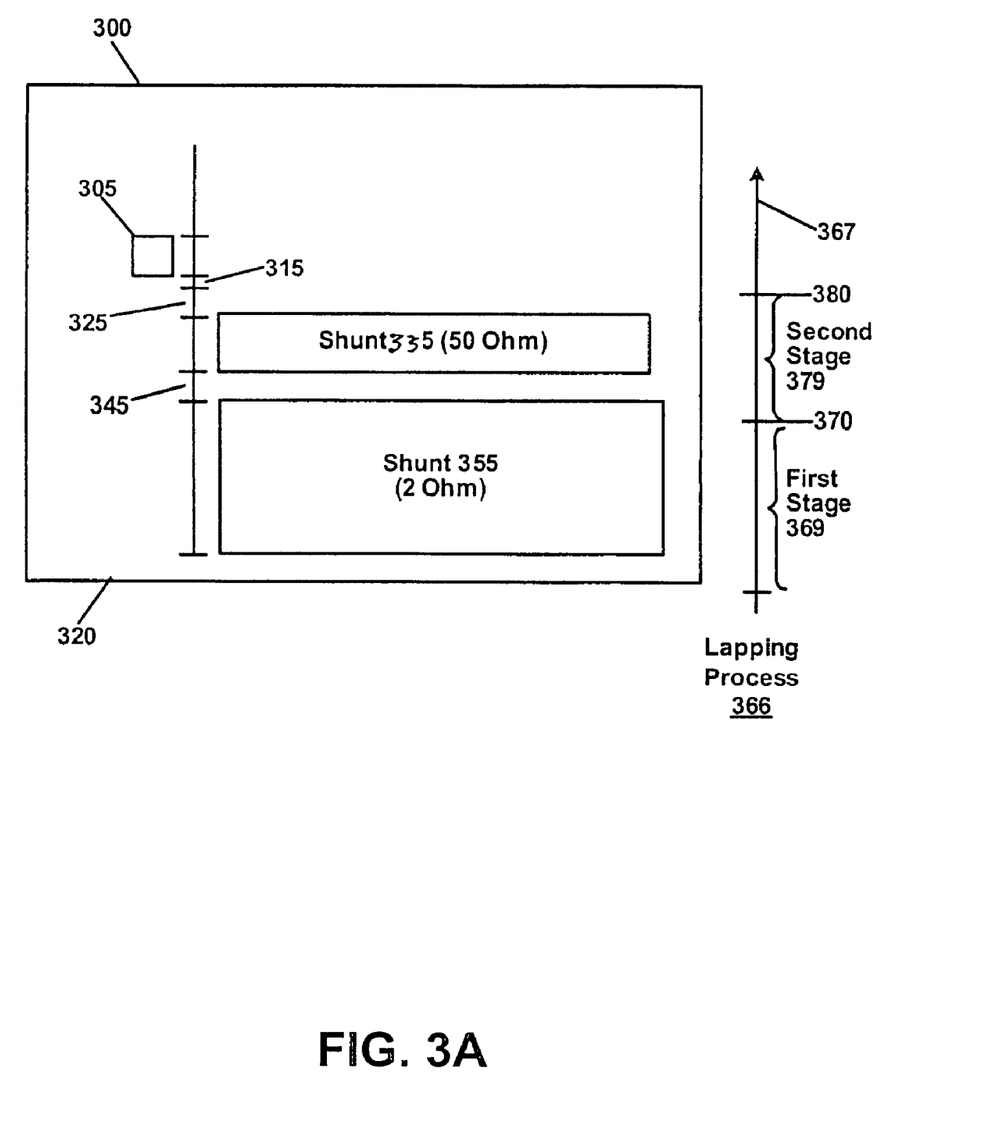
FIG. 3A is a block diagram of a fabricated read/write head slider structure in accordance with an embodiment of the present invention.

FIG. 3A is a front-facing block diagram illustrating a read/write head slider 300, subsequent to the slicing thereof and prior to receiving thereon a lapping process 366, in an embodiment of the present invention. Slider 300 is implementable as and functionally analogous to slider 229 of FIGS. 2A and 2B. It is noted that many prior processes have been performed on slider 300 to reach a lapping ready point including, but not limited to, lithography, deposition (vacuum, plating, or sputtering), sensor deposition, shunt deposition, etching, slicing and dicing. Examples of etching processes can include, but which is not limited to, broad-beam ion etching, reactive ion etching, ion-beam etching, polymer etching, and other similar processes. In an embodiment of the present invention, permalloy is used in the fabrication of sensor 305 as well as shunts 335 and 355. Alternatively, other functionally analogous materials may be used in fabricating sensor 305 and shunts 335 and 355. In fact, shunt 335, shunt 355, and sensor 305 may each be made of alternative functionally analogous materials.

It is also noted that subsequent to the lapping process as described herein with reference to FIGS. 3A, 3B, 3C, 4, 5, and 6, slider 300 is subject to additional processes including, but not limited to, subsequent thin film deposition, photolithography, and dry etching that produces a completed read write head slider.

With continued reference to FIG. 3A, in one embodiment, subsequent to fabrication and slicing, slider 300 includes a sensor 305, shunt 335, and shunt 355. In an embodiment, shunt 335 and shunt 355 are a resistive material having a resistive value. In one embodiment, shunt 335 can have a greater resistive value than shunt 355. In an alternative embodiment, shunt 335 can have a lesser resistive value than shunt 355. In yet another embodiment, shunts 335 and 355 can have similar resistive values. In one embodiment, shunt 335 can have a resistive value of approximately 50 ohms and shunt 355 can have a resistive value of approximately 2 ohms. In the present embodiment, shunt 335 can have, but is not limited to, dimensions of approximately 0.05 micrometers by 2 micrometers. Further, the surface of shunt 355 most remote from sensor 305 can be at a distance of approximately 700 nanometers, prior to lapping process 366. In the present embodiment, shunt 335 can have, but is not limited to, dimensions of approximately 0.1 micrometers by 1 micrometer. Further, the surface of shunt 335 most remote from sensor 305 can be at a distance of approximately 160 nanometers. It is noted that shunts having alternative resistive values, sizes, and distances (from sensor 305) can be implemented in alternative embodiments of the present invention.

Slider 300 of FIG. 3A also includes separations 315, 325, and 345. Separation 345 is for providing a definitive demarcation between shunt 355 and shunt 335. Separation 325 is for providing a definitive demarcation between shunt 335 and the point in wafer 300 where sensor 305 is opened. In an embodiment, sensor 305 may be opened at separation 315. In one embodiment, separations 325 and 345 can provide a separation of 50 nanometers. In an alternative embodiment, separations 325 and 345 may provide varying distances of separation In one embodiment, separation 315 can be utilized for determining the spacer height and can provide 10 nanometers of separation. In an alternative embodiment, separation 315 can be greater than or less than 10 nanometers.

FIG. 3A also depicts a lapping process 366 to be performed on slider 300. In one embodiment, lapping process 366 commences on surface 320, an air bearing surface (ABS) of slider 300. Lapping process 366 is applied in an upward direction (relative to wafer 300 of FIG. 3A) as indicated by arrow 367. Arrow 367 includes a first stage lap end point 370 and a second stage lap end point 380.

In one embodiment, lapping process 366 can include a first stage lapping process 369 and a second stage lapping process 379. First stage end point 370 can cause cessation of first stage lapping process 369 and second stage end point 380 can cause cessation of second stage lapping process 380. In alternative embodiment, lapping process 366 may have fewer or greater stages.

In an embodiment, first stage lapping process 369 is a coarser lapping process (less precise) than second stage lapping process 379. In an alternative embodiment, first stage lapping process 369 and second stage lapping process 379 can have the same lapping rate. In yet another embodiment, first stage lapping process 369 is a finer lapping process (more precise) than second stage lapping process 379. In one embodiment, first stage lapping process 369 has a lapping rate of 300 nanometers per minute. In one embodiment, second stage lapping process 379 can have lapping rate of 30 nanometers per minute. It is noted that varying lapping rates can be implemented in first stage lapping process 369 and second stage lapping process 379 in another embodiment of the present invention.

In one embodiment, first stage lapping process 369 commences on surface 320 and reduces slider 300 and shunt 355 to first stage end point 370. First stage end point 370 can be a stopping point of lapping process 369 predicated on time, lapping rate, or a combination thereof, in an embodiment of the present invention. In one embodiment, first stage end point 370 is when first stage lapping process 369 laps to a resistance target of 15 ohms to shunt 335. In an alternative embodiment, first stage end point 370 can be when first stage lapping process 369 laps to shunt 335. Alternatively, first stage end point 370 can be determined by a variety of parameters, depending upon the structure and the desired end result. In the present embodiment, upon reaching first stage end point 370, first stage lapping process 369 is stopped.

Continuing, subsequent to stopping first stage lapping process 369 at first stage end point 370, second stage lapping process 379 commences at first stage end point 370 and continues until reaching second stage end point 380, in one embodiment of the present invention. Second stage end point 380 can be a stopping point of lapping process 379 predicated on time, lapping rate, or a combination thereof, in an embodiment of the present invention. Second stage end point 380 can also be predicated upon detection of an exponential increase in sensor signal amplitude. This increase is an indication that sensor 305 has been uncovered. In one embodiment, second stage end point 380 is when second stage lapping process 379 laps until sensor 305 is opened (uncovered). In the present embodiment, lapping process 366, particularly second stage lapping process 379 can cease when the sensor amplitude signal shows an exponential increase. Further, because the distance between the remote surface of the shunts 335 and 355 and sensor 305 is a known quantity, a combination of applied lapping force and lap duration can be utilized to predict the second stage end point 380, in another embodiment of the present invention. In an alternative embodiment, second stage end point 380 can be when second stage lapping process 379 laps through shunt 335 and reaches separation 315. Alternatively, second stage end point 380 can be determined by a variety of parameters, depending upon the structure and the desired end result. In the present embodiment, upon reaching second stage end point 380, second stage lapping process 379 is stopped.

It is particularly noted that through the utilization of shunts 335 and 355, the lapping process 366 described herein does not directly contact sensor 305 as in conventional lapping techniques. It is noted that shunts 335 and 355 can provide protection against electrostatic discharge (ESD) during wafer fabrication of the read/write head. It is also noted that embodiments of the present invention further provide for protection against ESD occurring during lapping of read/write head 305 of slider 300. Further, in tunnel-junction read/write heads, embodiments of the present invention protect against smearing of the sensor which is known to cause widely varying signals and which is common during the early stages of a lapping process 366. It is additionally noted that embodiments of the present invention further provide for a lapping process 366 which provides increased accuracy in read/write heads having a recessed sensor 305. This enables embodiments of the present invention to provide a decrease in, if not eliminate, instances of material under stress that can damage sensor 305 as well as all but eliminating electrostatic discharge (ESD).

Figure 3B:
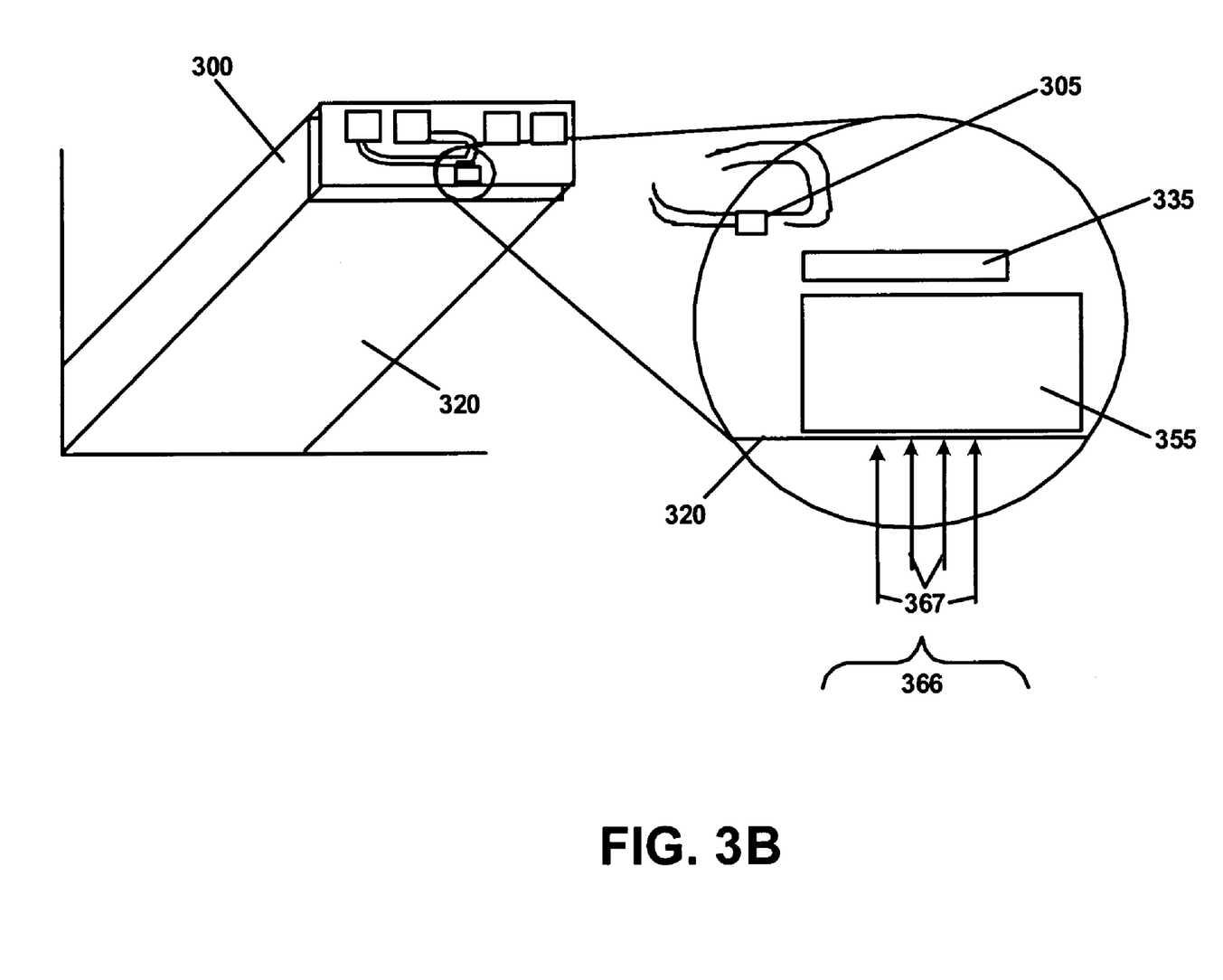
FIG. 3B is a block diagram of a read/write head slider and a lapping process applicable to the read/write head slider of FIG. 3A, in accordance with an embodiment of the present invention.

FIG. 3B is an initial sequential illustrated diagram of sensor 305 disposed on a slider 300 for showing lapping process 366, in an embodiment of the present invention. Lapping process 366, more particularly, first stage lapping process 369 is to commence. Lapping process 366 is applied to slider 300 at surface 320 and is applied in the direction as indicated by arrows 367. In the present embodiment, first stage lapping process laps at a rate of 300 nanometers per minute and has ceased upon lapping within 15 ohms of shunt 335, as indicated by first stage end point 370 as shown in FIG. 3C.

Figure 3C:
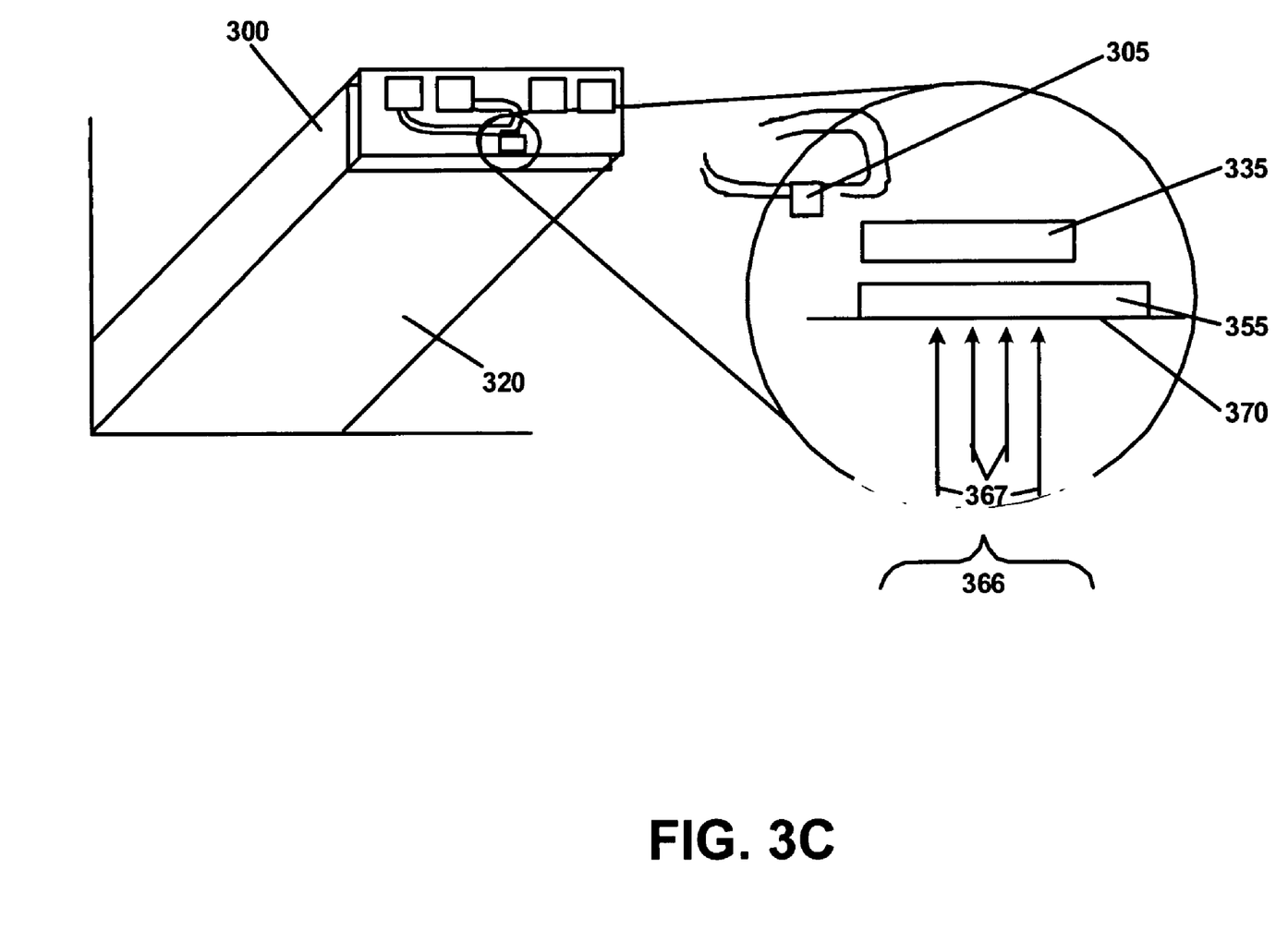
FIG. 3C is a sequential block diagram illustrating results of a first lapping process applied to the read/write head slider of FIG. 3B.

FIG. 3C is a second sequential illustrated diagram of sensor 305 disposed on a slider 300 showing lapping process 366 subsequent to cessation of first stage lapping process 369 upon reaching first stage end point 370, in an embodiment of the present invention. Lapping process 366, more particularly, second stage lapping process 379 is to commence. Lapping process 366 is applied to slider 300 at surface 320 and at the remainder of shunt 355 and is applied in the direction as indicated by arrows 367. In the present embodiment, second stage lapping process laps at a rate of 30 nanometers per minute and has ceased upon opening sensor 305, as indicated by second stage end point 380 as shown in FIG. 3D.

Figure 3D:
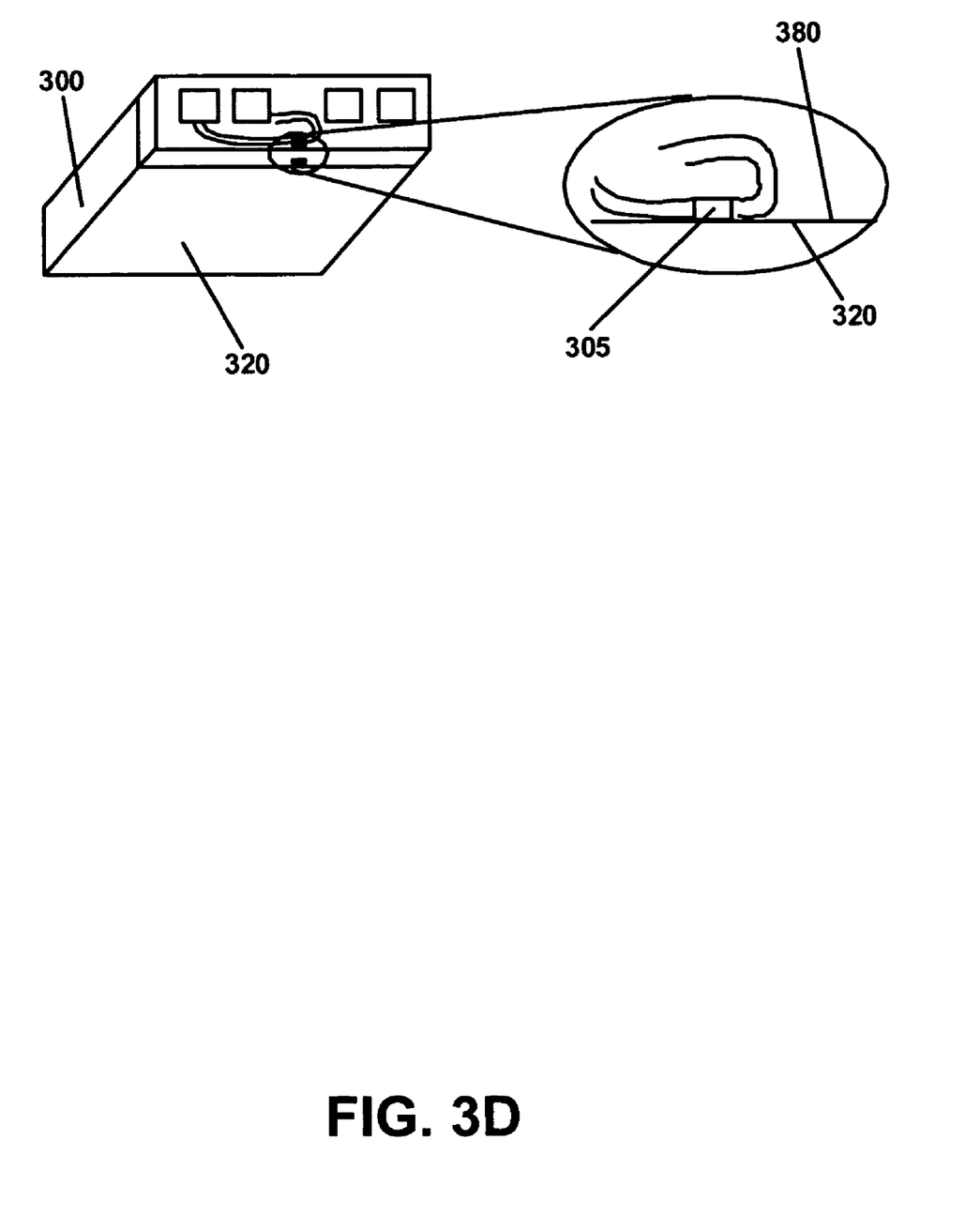
FIG. 3D is a sequential block diagram illustrating results of a second lapping process applied to the read/write head slider of FIG. 3B, in accordance with an embodiment of the present invention.

FIG. 3D is a third sequential illustrated diagram of sensor 305 disposed on a slider 300 showing results of lapping process 366 subsequent to cessation of second stage lapping process 379 upon reaching second stage end point 380, in an embodiment of the present invention. Lapping process 366, more particularly, second stage lapping process 379 has lapped slider 300 to the point where an exponential increase in sensor signal amplitude is detected, thus indicating opening of sensor 305.

Figure 4:
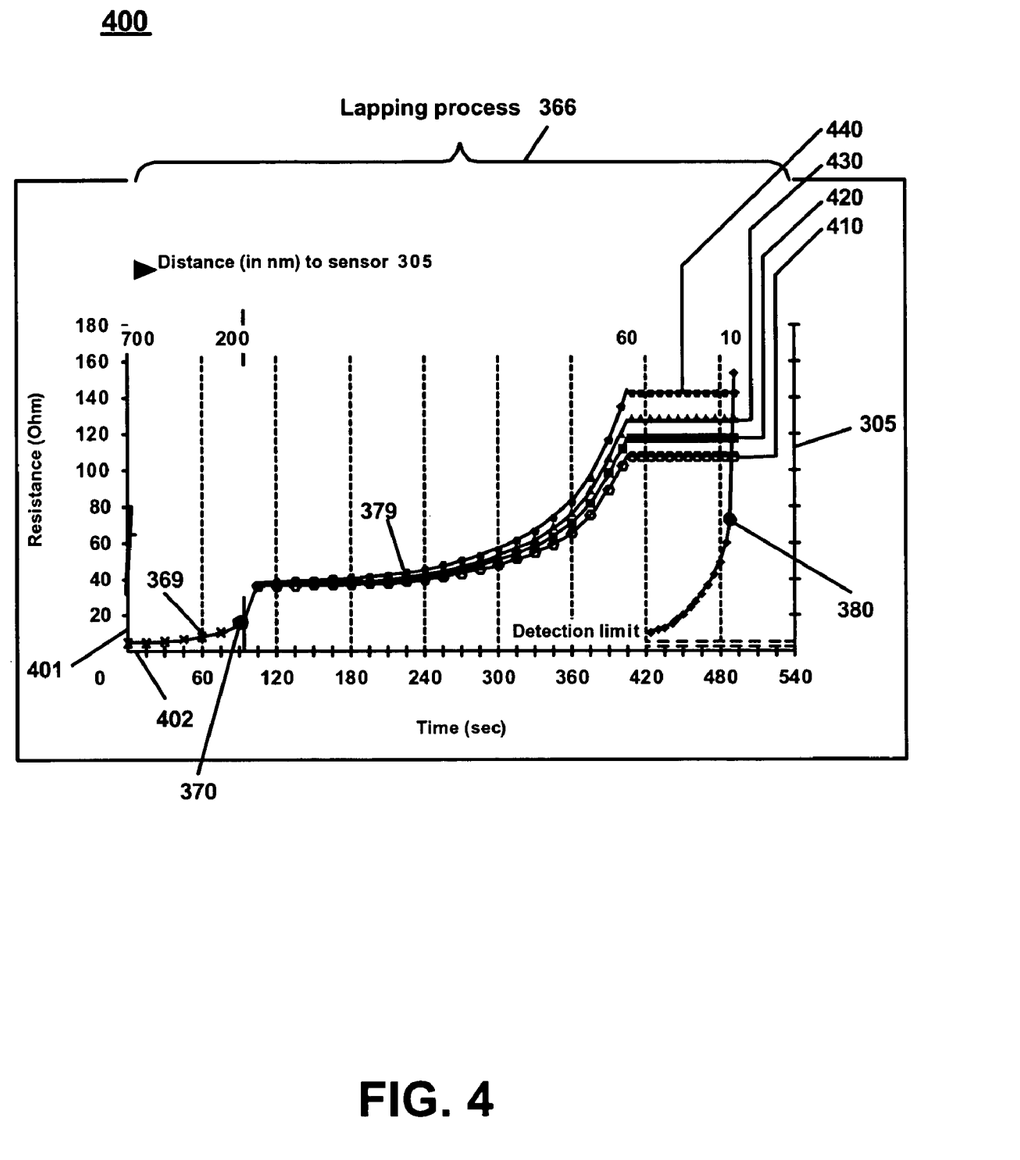
FIG. 4 is a graph diagram illustrating parameters of a lapping process applied to a read/write head slider, in accordance with an embodiment of the present invention.

FIG. 4 is a graph 400 depicting simulated resistance values associated with lapping process 366, including first stage lapping process 369 and second stage lapping process 379, in an embodiment of the present invention. Lapping process 366 is performed upon a read/write head slider 300, in an embodiment of the present invention.

Graph 400 includes a resistance line 401, representing resistance in ohms, on the left side of graph 400. On the bottom of graph 400 is a time line 402 representing time in seconds. As lapping process 366 is performed, the lapping is represented in a left to right direction and causes the distance between the lapping process commencing surface, e.g., 320 and sensor 305 to be reduced. Along the right side of graph 400 is line 305, representing the surface of sensor 305 that is most proximal to the lapping of lapping process 366. Further, near the top of the right side of graph 400 are track widths 410, 420, 430, and 440, representing the anticipated resistance for a particular track width. In graph 400, lines 410, 420, 430, and 440 represent track widths of 120 nanometers, 100 nanometers, 80 nanometers, and 60 nanometers, respectively. Also included in graph 400 is first lapping process 369 and second lapping process 379. Further shown are first stage lap end point 370 and second stage lap end point 380.

In accordance with an embodiment of the present invention, lapping process 366 is performed on surface 320 of slider 300 as described herein with reference to FIGS. 3A-3D, 5, and 6. Accordingly, lapping process 366 begins first lapping process 367 on surface 320 of slider 300 and continues lapping into shunt 355, in one embodiment of the present invention. As first lapping process 369 proceeds, the lapping resistance (Line 401) is shown to geometrically increase. At first stage lap end point 370, first lapping process 369 is stopped. First stage lap end point 370 is at approximately 15 ohms resistance. In an embodiment, first lapping process 369 laps at a rate of 300 nanometers per minute. Because of the coarse (less precise) lapping of first lapping process 369, there is significant surface scratching and defamation. Accordingly, by ceasing first lapping process 370 at a resistance of 15 ohms, such that a portion of shunt 355 remains, there is adequate material remaining (e.g., in excess of 200 nanometers before sensor contact) such that a finer (more precise) second lapping process 379 can comprehensively remove any surface deformities and/or abnormalities. It is noted that first stage lap end point 370 can be appropriately adjusted to reflect changes is the lapping rate of first lapping process 369.

Still referring to FIG. 4, second lapping process 379 commences at first stage lap end point 370, subsequent to cessation of first lapping process 369, in an embodiment of the present invention. As shown in FIG. 3C, a portion of shunt 355 remains and upon which second lapping process 379 commences. In the present embodiment, second lapping process 379 laps at a rate of 30 nanometers per minute, although alternative lapping rates could be implemented. Second lapping process 379 continues until reaching second stage lap end point 380 in accordance with an embodiment of the present invention. Second lapping process 379 laps through shunt 355, separation 345, shunt 335, separation 325 and uncovers sensor 305 when lap enters separation 315, in an embodiment. In an embodiment of the present invention, second stage lap end point 380 can be determined by detecting an exponential increase is sensor signal amplitude, a result of uncovering sensor 305. Graph 400 also includes track width lines 410, 420, 430, and 440, It is noted that the lapping resistance during second lapping process 379 remains constant once lapping process 379 enters separation 325. It is noted that as the track width decreases, lapping resistance increases.

Figure 5:
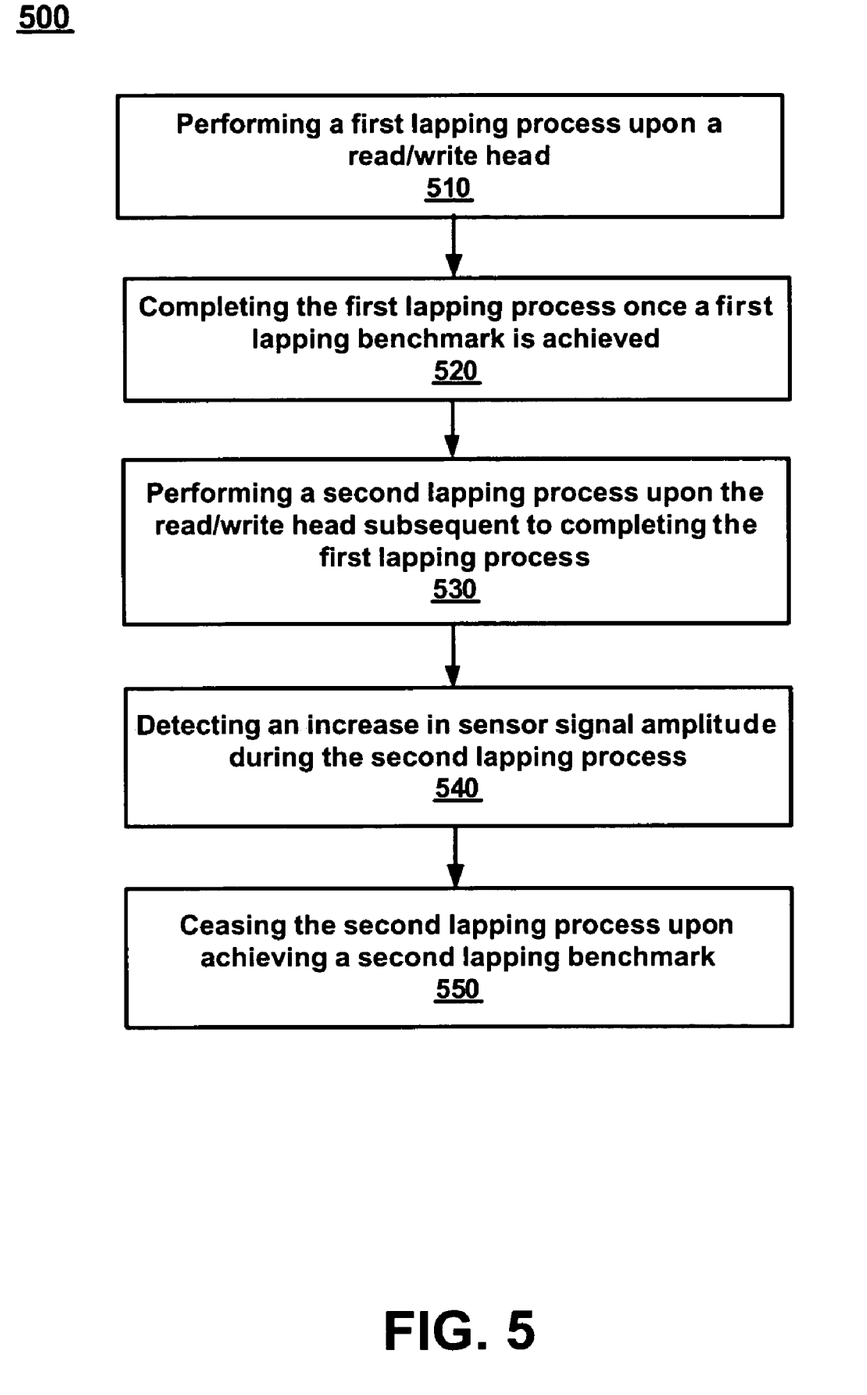
FIG. 5 is a flowchart of a lapping process applied to a read/write head slider in accordance with an embodiment of the present invention.

FIG. 5 is a flowchart 500 of a process for steps performed in accordance with one embodiment of the present invention for lapping of a read/write head slider. Flowchart 500 includes processes of the present invention which, in one embodiment, are carried out by fabrication and processing devices and components under the control of computer readable and computer executable instructions. The computer readable and computer executable instructions enable the fabrication and processing of a read/write head slider, e.g., slider 300. The computer readable and computer executable instructions may reside in any type of computer readable medium. Although specific steps are disclosed in flowchart 500, such steps are exemplary. That is, the present invention is well suited to performing various other steps or variations of the steps recited in FIG. 5. Within the present embodiment, it should be appreciated that the steps of flowchart 500 may be performed by software, by hardware or by any combination of software and hardware for facilitating a lapping of a fabricated and sliced read/write head slider, in an embodiment of the present invention.

In step 510 of FIG. 5, a first lapping process, e.g., 369, of a lapping process 366, as described herein with reference to FIGS. 3A, 3B, 4, and 6, is performed on a fabricated read/write head slider 300 in an embodiment of the present invention. First lapping process 369 commences on surface 320 and laps into shunt 355 until reaching first stage lap end point 370.

In step 520 of flowchart 500 of FIG. 5, first lapping process 369 has reached first stage lap end point 370 and has ceased lapping, as described herein with reference to FIGS. 3A, 3B, 4, and 6. In an embodiment, first lapping process 369 laps at a rate of 300 nanometers per minute. In an embodiment, first stage lap end point 370 is at 15 ohms of lapping resistance within shunt 355, as shown in FIG. 4.

In step 530 of flowchart 500, a second lapping process 379 of lapping process 366 is performed on read/write head slider 300 in an embodiment of the present invention. Second lapping process 379 commences at first stage lap end point 370 and begins lapping upon the remainder of shunt 355, in an embodiment and as described herein with reference to FIGS. 3A, 3C, 4 and 6. In an embodiment, second lapping process 379 laps at a rate of 30 nanometers per minute. Second lapping process 379 continues until reaching second stage lap end point 380.

In step 540 of flowchart 500, as second lapping process 379 continues reducing shunt 355, separator 345, shunt 335, separator 325, and separator 315, an exponential increase in sensor signal amplitude is detected, as shown in FIG. 4. The detection of the increase in sensor signal amplitude indicates uncovering of sensor 305, in accordance with an embodiment of the present invention.

Accordingly, in step 550 of flowchart 500, second lapping process 379 stops at second stage lap end point 380, in accordance with an embodiment of the present invention.

Figure 6:
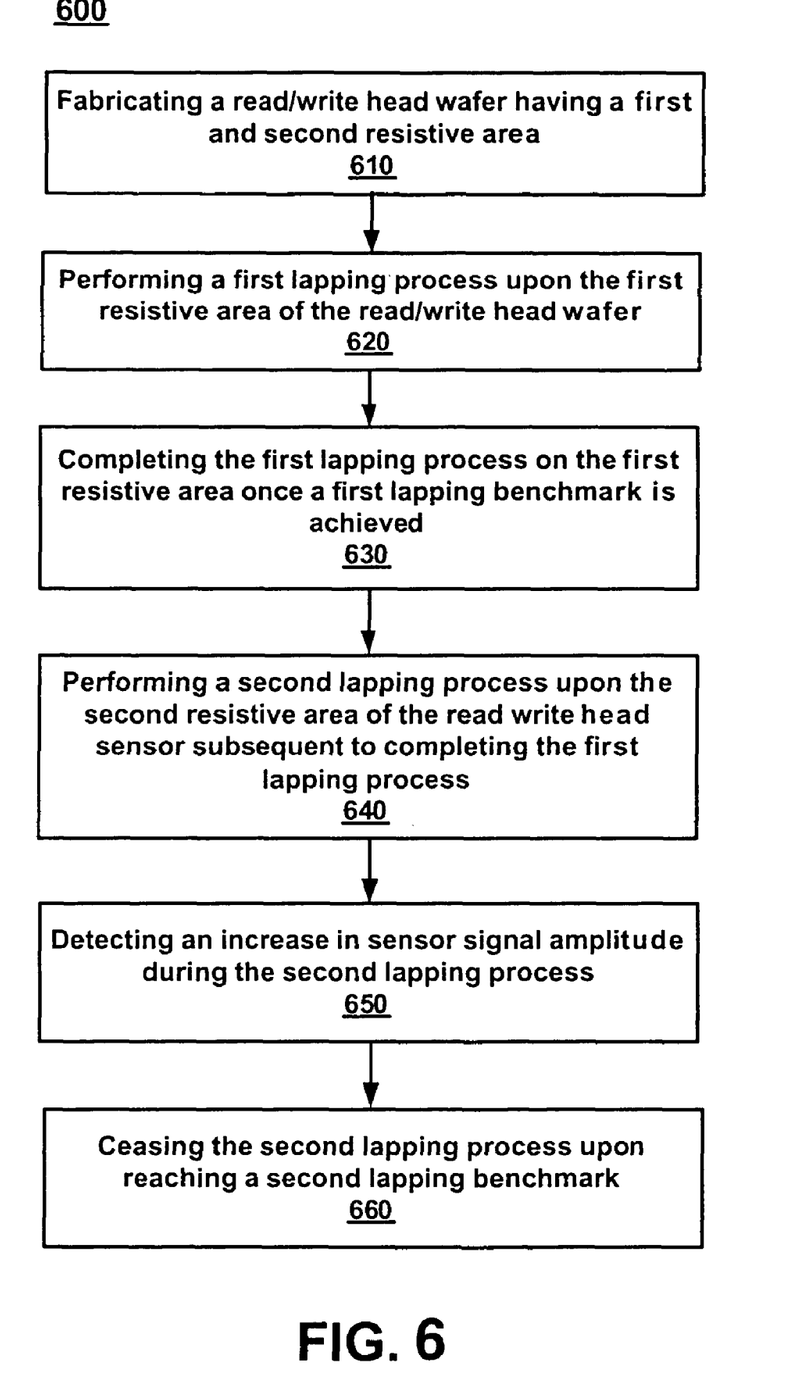
FIG. 6 is a flowchart of a method for read/write head slider fabrication and an associated lapping process in accordance with an embodiment of the present invention.

FIG. 6 is a flowchart 600 of a process for steps performed in accordance with one embodiment of the present invention for the fabrication and subsequent lapping of a read/write head slider. Flowchart 600 includes processes of the present invention which, in one embodiment, are carried out by fabrication and processing devices and components under the control of computer readable and computer executable instructions. The computer readable and computer executable instructions enable the fabrication and processing of a read/write head slider, e.g., slider 300. The computer readable and computer executable instructions may reside in any type of computer readable medium. Although specific steps are disclosed in flowchart 600, such steps are exemplary. That is, the present invention is well suited to performing various other steps or variations of the steps recited in FIG. 6. Within the present embodiment, it should be appreciated that the steps of flowchart 600 may be performed by software, by hardware or by any combination of software and hardware for facilitating the fabrication and lapping of a sliced read/write head slider, in an embodiment of the present invention.

In step 610 of flowchart 600, a read/write head slider 300 including a sensor 305, shunts 335 and 355, and separators 315, 325, and 335 is fabricated in accordance with an embodiment of the present invention and as described herein with reference to FIG. 3. Upon fabrication, read/write head 305 is subject to slicing, the process that separates each read/write head 305 from the wafer and becomes part of slider 300.

In step 620 of FIG. 6, a first lapping process, e.g., 369, of a lapping process 366, as described herein with reference to FIGS. 3A, 3B, and 4, is performed on a read/write head slider 300 in an embodiment of the present invention First lapping process 369 commences on surface 320 and laps into shunt 355 until reaching first stage lap end point 370.

In step 630 of flowchart 600 of FIG. 6, first lapping process 369 has reached first stage lap end point 370 and has ceased lapping, as described herein with reference to FIGS. 3A, 3B, and 4. In an embodiment, first lapping process 369 laps at a rate of 300 nanometers per minute. In an embodiment, first stage lap end point 370 is at 15 ohms of lapping resistance within shunt 355, as shown in FIG. 4.

In step 640 of flowchart 600, a second lapping process 379 of lapping process 366 is performed on read/write head slider 300 in an embodiment of the present invention. Second lapping process 379 commences at first stage lap end point 370 and begins lapping upon the remainder of shunt 355, in an embodiment and as described herein with reference to FIGS. 3A, 3C, and 4. In an embodiment, second lapping process 379 laps at a rate of 30 nanometers per minute. Second lapping process 379 continues until reaching second stage lap end point 380.

In step 650 of flowchart 600, as second lapping process 379 continues reducing shunt 355, separator 345, shunt 335, separator 325, and separator 315, an exponential increase in sensor signal amplitude is detected, as shown in FIG. 4. The detection of the increase in sensor signal amplitude indicates uncovering of sensor 305, in accordance with an embodiment of the present invention.

Accordingly, in step 660 of flowchart 600, second lapping process 379 stops at second stage lap end point 380, as described herein with reference to FIGS. 3A, 3C, 3D, 4, and 5, in accordance with an embodiment of the present invention.

Advantageously, embodiments of the present invention provide a method for fabrication of a read/write head sensor that provides protection against lapping induced sensor damage as well as reducing instances of handling induced ESD. Further, embodiments of the present invention provide a finer (more precise) method of lapping, thus providing an increase in sensor sensitivity.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for lapping a read/write head comprising:
performing a first lapping process on a structure having said read/write head fabricated therein, said first lapping process providing a course lapping of a first resistive region of said structure, said first lapping process stopping after achieving a first lapping benchmark resistance; and
performing a second and final lapping process on said structure at a second resistive region to expose a sensor coupled with said read/write head, said second lapping process performing a finer lapping at a rate lesser than said first lapping process, said second lapping process stopping said lapping after an exponential increase in said sensor signal amplitude from said sensor coupled with said read/write head is detected, said second resistive region interposed between said first resistive region and said read/write head, said second resistive region having a higher resistive value that said first resistive region.

2. The method as recited in claim 1 further comprising:
ceasing said first lapping process upon reduction of said first resistive region to a desired volume.

3. The method as recited in claim 1 further comprising:
detecting an increase in a sensor amplitude signal during said second lapping, said increase indicating said second lapping benchmark.

4. The method as recited in claim 3 further comprising:
ceasing said second lapping upon said detecting said increase in said sensor amplitude signal.

5. The method as recited in claim 1 further comprising:
reducing handling induced electrostatic discharge to a sensor of said read/write head.

6. The method as recited in claim 1 further comprising:
decreasing lapping induced surface damage of a sensor of said read/write head.

* * * * *

UNITED STATES PATENT AND TRADEMARK OFFICE
CERTIFICATE OF CORRECTION

PATENT NO. : 8,070,554 B2
APPLICATION NO. : 10/990926
DATED : December 6, 2011
INVENTOR(S) : Robert E. Fontana, Jr., Neil Leslie Robertson and Huey-Ming Tzeng It is certified that error appears in the above-identified patent and that said Letters Patent is hereby corrected as shown below:

Title page, item [75]

Delete: "Inventors: Robert E. Fontana, Jr., Santa Jose, Ca (US)
Neil Leslie Robertson, Palo Alto, Ca (US)
Huey-Ming Tzeng, Santa Jose, Ca (US)"

and

Replace with: Inventors: Robert E. Fontana, Jr., San Jose, Ca (US)
Neil Leslie Robertson, Palo Alto, Ca (US)
Huey-Ming Tzeng, San Jose, Ca (US)

Signed and Sealed this
Tenth Day of April, 2012

David J. Kappos
*Director of the United States Patent and Trademark Office*